MAGNETIC TRANSDUCER AND METHOD

Filed Feb. 9, 1954 3 Sheets-Sheet 1

INVENTOR.
EDGAR ALAN BROWN
BY
John B. Sponsler
AGENT

Dec. 1, 1959 E. A. BROWN 2,915,593

MAGNETIC TRANSDUCER AND METHOD

Filed Feb. 9, 1954 3 Sheets-Sheet 2

*INVENTOR.*
EDGAR ALAN BROWN

*BY* John B. Sponsler
AGENT

Dec. 1, 1959 E. A. BROWN 2,915,593

MAGNETIC TRANSDUCER AND METHOD

Filed Feb. 9, 1954 3 Sheets-Sheet 3

INVENTOR.
EDGAR ALAN BROWN
BY John B. Sponsler
AGENT

United States Patent Office 2,915,593

Patented Dec. 1, 1959

2,915,593

MAGNETIC TRANSDUCER AND METHOD

Edgar Alan Brown, Owego, N.Y., assignor to International Business Machines Corporation, New York, N.Y., a corporation of New York Application February 9, 1954, Serial No. 409,101

12 Claims. (Cl. 179—100.2)

This invention relates to magnetic recording and reproducing devices, and particularly to transducer components thereof whereby intelligence signals are derived from magnetized spots or areas recorded upon a magnetizable surface or layer, or whereby spots or areas are recorded upon a magnetizable surface in response to intelligence signals.

More particularly this invention is concerned with magnetic transducer devices whereby magnetized spots are recorded upon and reproduced from a magnetizable surface of a so-called "magnetic drum" of the type wherein a cylinder of non-magnetic material is coated or plated with a magnetizable peripheral surface. Normally the magnetic coating of these cylinders is a few thousandths of an inch or less in thickness in order to keep the saturating recording current to a value low enough to be supplied from the output circuits of low powered electron discharge tubes. It customary also in magnetic drum apparatus of this kind to space the transducer device from the drum so that the magnetic recording or reproducing element does not contact the magnetizable surface with which it cooperates to record and reproduce intelligence signals in contradistinction with the well-known direct contact arrangement of Poulsen. This arrangement is made to avoid scratching or penetrating the thin magnetizable drum surface which obviously would result in damaging the magnetic recording properties of the drum.

Two problems which arise in magnetic recorders of this type are: (1) spacing the recording and reproducing transducer a suitable distance from the drum surface to obtain effective magnetization of the surface and also to enable effective reproduction of the intelligence signals, and (2) providing an arrangement whereby an expansion of the drum, e.g., due to temperature rise, etc., wherein the radius of the drum is increased by an amount equal to or greater than the spacing of the transducer from the drum, does not result in damage to the magnetizable surface or to the transducer per se.

It is an object of this invention to provide an improved magnetic recording transducer for cooperation with a magnetic drum wherein means is provided for setting the transducer-drum spacing accurately.

It is a further object of this invention to provide an improved magnetic recording transducer for cooperating with a magnetic drum wherein an increase in drum radius will not result in damage to the drum's surface arising out of contact between the drum and the normally spaced away transducer.

Another object of this invention is to provide a method for obtaining the optimum recording and reproducing efficiency between a magnetic transducer and a magnetic drum recording surface cooperating therewith.

A further object is to provide a simple and rapid method for adjusting the spacing between a magnetic transducer and a cooperating magnetic drum under actual operating conditions with the drum rotating at full speed.

Still another object of the invention is to provide a method for spacing magnetic transducers from a rotating magnetic drum without physically measuring the space distance.

A still further object is the provision of a mounting for a magnetic transducer and a coacting magnetic drum whereby a recording time shift can be obtained independently of the timing of the drum rotation or of the recording circuits.

Other objects of the invention will be pointed out in the following description and claims and illustrated in the accompanying drawings, which disclose, by way of examples, the principle of the invention and the best mode, which has been contemplated, of applying that principle.

Figures 1, 2, 3, 4:
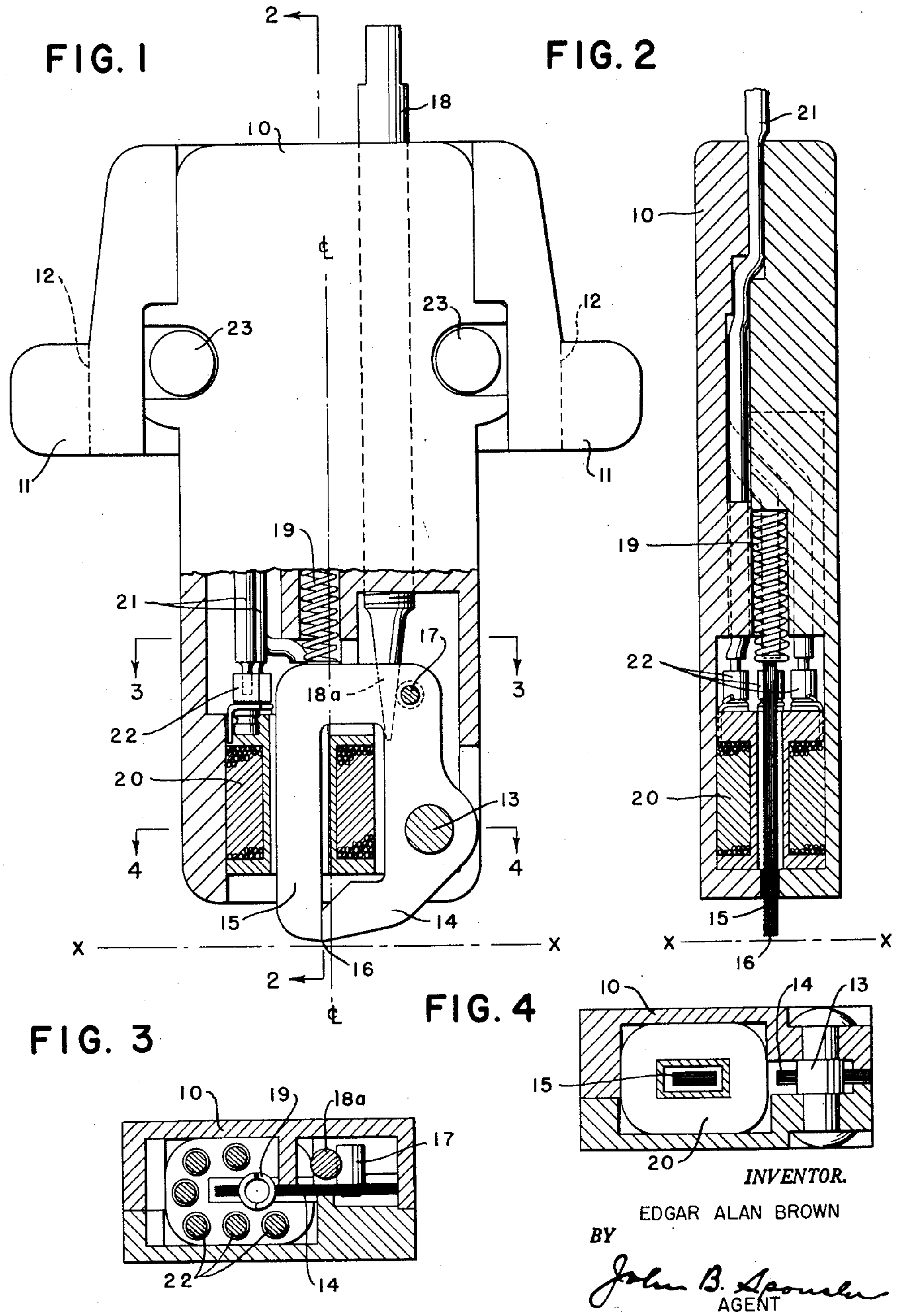
Fig. 1 is a front elevation view of a novel transducer with certain parts broken away to illustrate its functioning.
Fig. 2 is a sectional view of Fig. 1 along the line 2—2.
Fig. 3 is another sectional view of Fig. 1 along the line 3—3.
Fig. 4 is still a third sectional view of Fig. 1 along the line 4—4.

In Fig. 1 a mounting 10 of a suitable material such as a plastic supports a winding 20, which may consist of a single winding or multiple windings, having terminals 22 (see also Figs. 2 and 3) to which leads 21 are carried through the mounting 10. A laminated core structure including the legs 14 and 15 is rotatably supported by a pin 13 in the mounting 10, and an air gap 16 is provided between the extremities of the legs 14 and 15, the air gap being filled with a non-magnetic material such as silver solder, and the leg 15 passing loosely through the winding 20. Normally the core structure is urged in a counterclockwise direction by a spring 19. A stud 17 is carried by the core structure and cooperating therewith is a threaded cam rod 18 threaded in the mounting 10. When the rod 18 is rotated, thereby translating the rod downward (as viewed in Fig. 1), a tip 18*a* on the rod 18 coacts with the stud 17 to cam the core structure in a clockwise direction against the resilience of the spring 19. Any upward thrust of the core structure is also resisted by the resilience of the spring 19.

The mounting 10 is preferably molded and may comprise two halves, as indicated by the cross-hatching of Figs. 2, 3, 4, fastened together by rivets 23. The mounting 10 is also provided with ears 11, which are slotted from the ear tips to the body line 12 of the mounting 10 to permit the mounting to be adjustably fastened to a pair of bars 24 and 25 by mounting bolts 12*a* and 12*b* and spring clips 11*a* and 11*b* for coacting with a magnetic drum 27 (as in Fig. 5) which rotates about a shaft 26.

The construction of the magnetic transducer is best understood from the foregoing description in connection with Figs. 1–4, inclusive. Application of a magnetic transducer of this type is best understood from the drawing of Fig. 5 where, as also previously described, the transducer is mounted upon a pair of bars 24 and 25 in proximity to a magnetic recording drum 27, which in operation continuously rotates at a predetermined speed about its axis (shaft 26).

Figure 5:
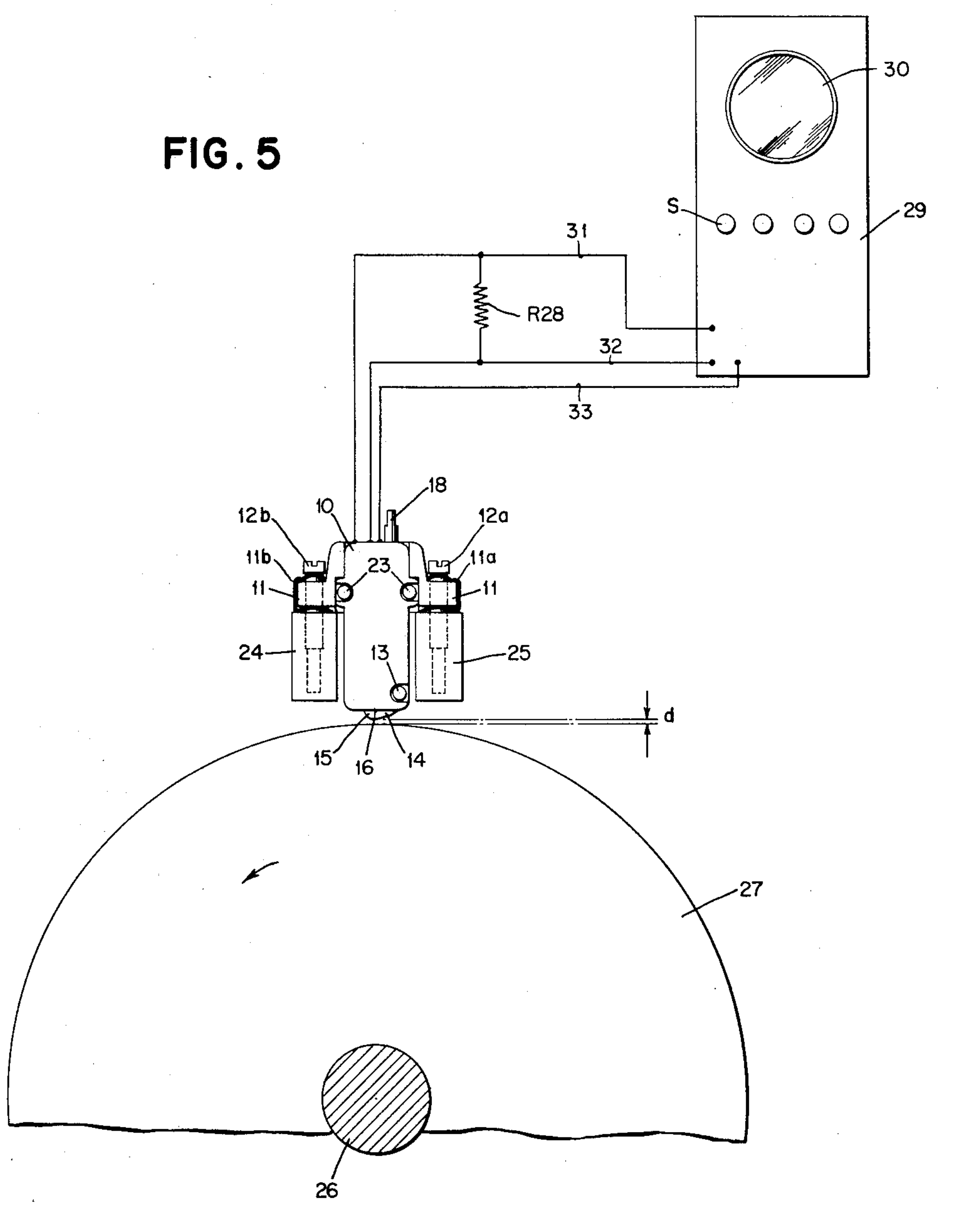
Fig. 5 is a diagrammatic view of the transducer of Fig. 1 adapted to a novel arrangement for spacing a magnetic transducer from a magnetic drum.

For purposes of explanation let it be assumed that the transducer shown in Fig. 5 is provided with two (2) windings: (1) a first winding for recording discrete magnetic spots or "bits" upon the surface of the drum 27, and (2) a second winding for reproducing signals from discrete magnet spots recorded on the drum by the first winding. Referring again to Fig. 5 the arrangement provides for a power supply 29 including a conventional source of timed electrical pulses selectively controlled by a switch S for energizing the first mentioned (recording) winding of the transducer and an amplifier and indicating device 30, preferably of the cathode ray tube type, for measuring the amplitudes of voltage pulses (appearing across a resistor R28) induced in the second mentioned (reproducing) winding of the transducer when the recorded magnetized spots are "read back," the lines 31, 32 and 33 connecting the transducer windings to the power supply 29.

Conventionally, as shown in Fig. 5, the transducer is arranged to be spaced away from the peripheral surface of the drum 27 so that a distance *d* separates the core legs 14—15 (at the air gap 16) from the drum surface. The distance *d* is hereinafter referred to as "transducer-drum space," such space being necessary to prevent contact between the transducer core and the drum resulting in excessive wear and damage to one or the other (or both). Heretofore "transducer-drum space" has been adjusted with the magnetic drum stationary by means of a shim or similar spacing facility placed between the drum and the transducer core. However, it has been determined that such adjustment frequently results in non-uniform and unsatisfactory recordings and reproductions where the "transducer-drum space" is set in that manner. Consequently where many transducers have to be adjusted to a single magnetic drum, as with most magnetic drum storage devices, a great amount of time is consumed in adjustment of "transducer-drum space" in repeated tedious adjustments.

By the arrangement in Fig. 5 it is possible to adjust the "transducer-drum space" by mounting the transducer upon the bars 24 and 25 via bolts 12*a* and 12*b* and spring clips 11*a* and 11*b* so that the core (legs 14 and 15) rests upon the surface of drum 27 at the air gap 16, the core being urged against the drum by spring 19 (see Fig. 1). By means of the rod 18 the core may then be spaced from the drum to permit a thin shim to pass therebetween. The drum is then rotated in the conventional manner, e.g., by an alternating current synchronous motor, to revolve at a constant speed and the switch S is operated on power supply 29 thereby energizing the recording winding of the transducer and recording a discrete spot on the drum. The reproducing winding of the transducer immediately senses the recorded spot and develops a potential across the resistor R28 which is reflected by the amplitude of the pulse appearing upon the cathode ray tube indicator 30. The rod 18 may be thereafter further adjusted to increase the "transducer-drum space" until a predetermined amplitude is obtained in the indicator 30, and all transducers of a particular multiple transducer magnetic storage drum unit may be thus uniformly adjusted. In the event of drum expansion since the cores of the transducers are spring urged toward the drum damage will not result through contact of the cores with the drum surface, however. While this method of adjustment can be made with the drum revolving optimum recording and reproducing efficiency is not obtained due to the excessive "transducer-drum space" setting required to obtain uniform signals from a plurality of transducers. Careful and accurate design of both transducer devices and magnetic drum components tends to improve the recording and reproducing efficiency; however, this procedure is both costly and time consuming, frequently resulting in undesirable production requirements.

In order to obtain the optimum efficiency of recording and reproducing in an arrangement as shown in Fig. 5 the following novel method eliminates the disadvantages noted immediately above. Again referring to Fig. 5 each transducer is mounted by the ears 11 to the fixed bars 24 and 25 via the bolts 12*a* and 12*b* and the corresponding spring clips 11*a* and 11*b*, the rod 18 being withdrawn so that no camming action occurs between the tip 18*a* and the stud 17 and the bolts 12*a* and 12*b* being not fully drawn up. A single pulse is then recorded upon the drum 27 and the amplitude of its corresponding signal, as reproduced, is observed on the indicator 30. One of the bolts 12*a* or 12*b* is then further drawn up and a second single pulse is recorded on the drum and its corresponding signal amplitude is observed on indicator 30. A succession of single pulses is recorded in this manner with an observation being made of the amplitude of each corresponding signal, either bolt 12*a* or bolt 12*b* being drawn up between each successive recording. As a result of this procedure a succession of signals will be reproduced and indicated at 30 with each successive signal having a greater amplitude since the "transducer-drum space" *d* is decreased after each such adjustment thereby reducing the air gap between the drum and the transducer. Finally when the "transducer-drum space" becomes zero as the core of the transducer actually contacts the drum surface no further increase in signal amplitude will be observed as successive single pulses are recorded on the drum. A further indication that the core has contacted the drum surface is observed in the indicator 30 by the presence of a ripple voltage or background interference in addition to the signals from the recorded pulses.

All of the adjustment noted in the preceding paragraph is made with the drum 27 rotating at its full operating speed, and the transducer core is permitted to contact the drum, while the latter continues to rotate at full speed, for a short period of time (this time was (1) minute for a particular design used). As a result of this "run in" period a honing action is obtained between each transducer core and the drum so that the curvature of the core portion in contact with the drum coincides with the curvature of the drum. Furthermore, the drum surface is cleaned of any film in the recording track of each transducer so that minute eccentricities of the drum surface are worn away further improving efficiency. Most of the honing, however, occurs on the core since the soft ferromagnetic laminations normally of which transducer cores are constructed are considerably softer than the magnetic surface of the drum, the surfaces of many magnetic drums being of a nickel-cobalt composition.

After the honing or "run-in" period the rod 18 of each transducer is turned to cause its core to be cammed free from the drum surface, i.e., to give the "transducer-drum space" a value greater than zero. The "transducer-drum space" may be set thereafter to obtain a predetermined signal value (the actual "transducer-drum space" may be varied from zero to several thousandths inches) with substantial uniformity for all transducers coacting with the magnetic drum. By this method optimum recording and reproducing efficiency is obtained without resorting to shims or other spacing devices for adjusting "transducer-drum space" and without introducing prolonged adjusting operations, which previously required several days for one magnetic drum unit having approximately 200 transducers. It is obvious that the "run in" or honing operation for a plurality of transducers coacting with the same drum can be accomplished simultaneously.

The improved method for obtaining optimum recording and reproducing efficiency, furthermore produces stronger signals (greater amplitude of reproduced signals) than with any other method for setting of "transducer-drum space" in magnetic drum recording devices. In a region of "transducer-drum space," *d* (for example between .00001 inch and .0005 inch with the particular head design used), it has been found that recording "off-drum" (where *d* is greater than zero) and reading back at this same $d$ gives a greater response than recording "on-drum" ($d$ equal to zero) and then reading "off-drum" at the same distance, $d$, as above.

Figure 6:
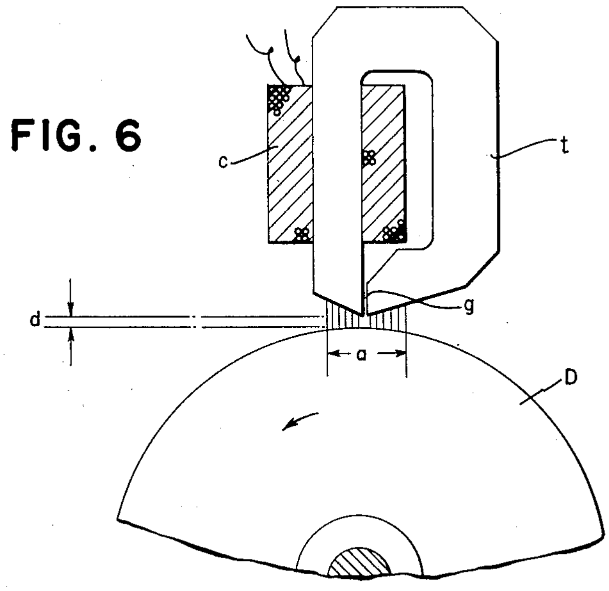
Fig. 6 is a diagrammatic view of a normal transducer-drum arrangement relative to space adjustment therebetween.
Figure 7:
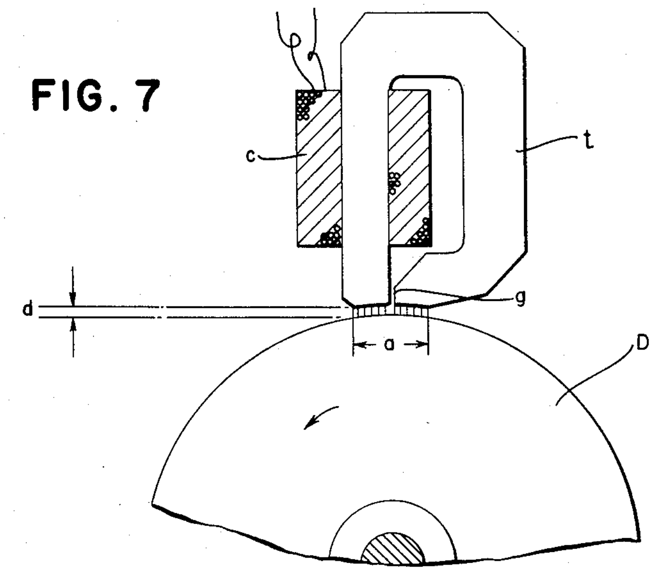
Fig. 7 is a diagrammatic view of the novel arrangement for spacing a magnetic transducer and a magnetic drum according to the teaching of the invention.

With reference to Fig. 6 a conventional transducer-drum arrangement is shown while Fig. 7 shows the novel arrangement of the invention. In both Figs. 6 and 7 a rotating magnetic drum D is arranged to coact with a transducer having a core $t$ provided with a winding $c$ and an air gap $g$ with a "transducer-drum space" $d$. It is obvious that in each instance (either in the arrangement of Fig. 6 or in the arrangement of Fig. 7) there is a spread of the recorded magnetic spot or "bit" defined by $a$. For an equal value of $d$ in each arrangement, all other factors being equal (viz. recording current, permeability, drum surface, etc.) it is obvious that the amount of recording flux being driven across the "transducer-drum space" in the spread area $a$ in the arrangement of Fig. 6 where the transducer core has not been "run in" is less than in the arrangement of Fig. 7 where the transducer core has been "run in," as heretofore described, since the "transducer-drum space" area above $a$ is greater in the arrangement of Fig. 6 than in the arrangement of Fig. 7. A similar condition exists when reading the recorded signal. Consequently, the arrangement shown in Fig. 7 will be more efficient.

A further unique advantage of the transducer arrangement shown in Fig. 5 is in the ability of the transducer of Fig. 1 to be shifted about its vertical centerline 180 degrees whereby a recording and/or reproducing time shift is obtained since the gap 16 of Fig. 1 is "off center." This construction provides a convenient way to effect a time shift of data in any magnetic drum path or track merely by reversing the mounting position of the transducer with respect to the fixed bars 24 and 25 of the arrangement of Fig. 5. This provides an additional flexibility not obtainable where the air gap, which defines the center of the recorded spot or "bit," is on the centerline of the transducer with respect to its mounting in relation to the magnetic drum upon which recordings are made.

In addition to the time shift achieved by the above method of rotating the transducer about its vertical centerline 180 degrees, a vernier time shift may be achieved by the following method: After the transducer core has been placed in contact with the drum surface as described above with reference to Fig. 5, bolt **12*a* may be adjusted in one direction and bolt 12*b* in the opposite direction to cause the air gap to move along the drum surface thereby achieving a time shift. If a starting point has been established by a signal from another transducer on the same drum then by observing the time shift on indicator 30** a predetermined time shift may be accurately obtained within the limits of the adjustment.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic transducer comprising a mounting, a closed core fastened to a pivot in the said mounting, a portion of the said core having an air gap, the said portion being arranged to extend from the said mounting to coact with a magnetic record at the said gap, resilient means on the said mounting for continuously urging the said core to be extended, means for retracting the said portion into the said mounting against the urging of the said resilient means, and a winding fixed in the said mounting through which the said core is movable.

2. A magnetic transducer including a winding, a closed core movable within the said winding and having an air gap for coacting with a magnetic record, a mounting in which the said winding is supported and in which the said core is pivotally fastened to permit the said gap to emerge therefrom, resilient means for urging the said core to emerge from the said mounting, and means for adjustably positioning the said core against the urging of the said resilient means.

3. A magnetic transducer comprising a mounting, a closed core pivotally fastened within the said mounting to permit a portion of the said core to emerge therefrom, the said core portion including an air gap for coacting with a magnetic record, a winding loosely surrounding another portion of the said core and fixedly supported in the said mounting, resilient means for urging the said core to pivot and the first said core portion to emerge, and means to adjustably pivot the said core against the urging of the said resilient means.

4. In a magnetic transducer having a winding, a closed core movable within the said winding, and a mounting for fixedly supporting the winding and pivotally supporting the core, means for urging the said core to pivot through the winding in one direction, and means for moving the core to pivot through the winding in the opposite direction.

5. In a magnetic transducer having a winding, a closed core including a portion thereof movable within the said winding, and means fixedly supporting the winding and pivotally supporting the core, means for causing the core to pivot in one direction, and means for causing the core to pivot in the opposite direction.

6. In a magnetic transducer having a winding, a closed core including a portion thereof movable through the said winding, and a mounting for fixedly supporting the winding and pivotally supporting the core to permit another portion thereof to emerge therefrom, resilient means for causing the second said core portion to emerge, and means for causing the second said portion to retract.

7. In a magnetic transducer having a winding, a closed core including a portion thereof movable through the said winding, and a mounting fixedly supporting the said winding and pivotally supporting the said core to permit another portion thereof to emerge therefrom, the second said portion including an air gap for coacting with a magnetic record, resilient means for urging the said core to pivot to cause the second said portion to emerge, and adjusting means to cause the said core to pivot in the opposite direction to retract the second said portion.

8. In a magnetic transducer having a winding, a closed core including a portion thereof movable through the said winding, and a mounting fixedly supporting the said winding and pivotally supporting the said core to permit another portion thereof to emerge therefrom, the second said portion including an air gap for coacting with a magnetic record, resilient means for urging the said core to pivot to cause the second said portion to emerge, a cam member in the said mounting for adjustably moving the said core to retract the second said portion, and a cam follower on the said core for cooperating with the said cam.

9. The method of adjusting a transducer having a resiliently mounted core in a magnetic drum recording device comprising revolving the drum at operating speed, spacing the core a predetermined distance from the recording surface of the drum, recording a succession of signals thereon, displaying the magnitude of the reproduced signals therefrom, incrementally reducing the said distance after each successive recording until the maximum reproduced signal magnitude is displayed, revolving the said drum with the core spacing so reduced for a predetermined period of time, and thereafter increasing the core spacing until a signal of predetermined magnitude is displayed.

10. A magnetic transducer comprising a mounting, a closed core positioned in said mounting, a portion of the said core having an air gap, the said portion being arranged to extend from the said mounting to coact with a magnetic record at the said gap, resilient means on the said mounting for continuously urging the said core to be extended, means for retracting the said portion into the said mounting against the urging of the said resilient means, and a winding fixed in the said mounting through which the said core is movable.

11. The method of adjusting a transducer in a magnetic drum recording device comprising revolving the drum at constant operating speed, spacing the transducer a distance from the recording surface of the drum, recording a succession of signals thereon, displaying the magnitude of the reproduced signals therefrom, incrementally urging the transducer toward the recording surface after each successive recording until the displayed magnitudes of successive reproduced signals become substantially equal, recording a succession of signals on said recording surface, displaying the magnitude of the reproduced signals therefrom, and incrementally increasing the distance of the transducer from the drum surface after each successive recording until a signal of predetermined magnitude is displayed.

12. The method of adjusting a transducer having a resiliently mounted core in a magnetic drum recording device comprising revolving the drum at constant operating speed, positioning the core in contact with the recording surface of the drum, recording a signal on said recording surface, displaying the magnitude of reproduced signals therefrom to thereby display the particular transducer quality, and incrementally increasing the distance of the core from the recording surface of the drum after successive reproduced signals until a signal of predetermined magnitude is displayed.

References Cited in the file of this patent

UNITED STATES PATENTS

| | | |
|---|---|---|
| 2,433,207 | Eilenberger | Dec. 23, 1947 |
| 2,612,566 | Anderson | Sept. 30, 1952 |
| 2,618,710 | Camras | Nov. 18, 1952 |
| 2,673,249 | Ericsson | Mar. 23, 1954 |
| 2,708,693 | Hendrickson | May 17, 1955 |
| 2,772,135 | Hollabaugh et al. | Nov. 27, 1956 |